(12) United States Patent
Gan et al.

(10) Patent No.: US 9,739,519 B2
(45) Date of Patent: Aug. 22, 2017

(54) STARTUP LOGIC FOR REFRIGERATION SYSTEM

(75) Inventors: Mingfei Gan, Manlius, NY (US); KeonWoo Lee, Manlius, NY (US); Hans-Joachim Huff, Mainz (DE); Aryn Shapiro, Syracuse, NY (US); Lucy Yi Liu, Fayetteville, NY (US); Gilbert B. Hofsdal, Chittenango, NY (US); Jian Sun, Fayetteville, NY (US)

(73) Assignee: CARRIER CORPORATION, Farmington, CT (US)

( * ) Notice: Subject to any disclaimer, the term of this patent is extended or adjusted under 35 U.S.C. 154(b) by 674 days.

(21) Appl. No.: 14/234,675

(22) PCT Filed: Jul. 25, 2012

(86) PCT No.: PCT/US2012/048099
§ 371 (c)(1),
(2), (4) Date: Jan. 24, 2014

(87) PCT Pub. No.: WO2013/016404
PCT Pub. Date: Jan. 31, 2013

(65) Prior Publication Data
US 2014/0150489 A1     Jun. 5, 2014

Related U.S. Application Data

(60) Provisional application No. 61/511,692, filed on Jul. 26, 2011.

(51) Int. Cl.
*F25B 49/02*     (2006.01)
*F25D 17/06*     (2006.01)
*F25B 1/10*      (2006.01)

(52) U.S. Cl.
CPC ............... *F25D 17/06* (2013.01); *F25B 1/10* (2013.01); *F25B 49/027* (2013.01);
(Continued)

(58) Field of Classification Search
CPC . F25B 2500/26; F25B 2400/23; F25D 11/003
See application file for complete search history.

(56) References Cited

U.S. PATENT DOCUMENTS 2,024,323 A * 12/1935 Wyld ......................... F25B 1/10
                                                                62/510
2,966,043 A * 12/1960 Ross .......................... F25B 1/10
                                                                62/174
(Continued)

FOREIGN PATENT DOCUMENTS

CN      101688698 A      3/2010
CN      101878406 A     11/2010
(Continued)

OTHER PUBLICATIONS

Chinese Office Action for application CN 201280037454.5, dated May 27, 2015, 13 pages.
(Continued)

*Primary Examiner* — Ljiljana Ciric
*Assistant Examiner* — Alexis Cox
(74) *Attorney, Agent, or Firm* — Cantor Colburn LLP

(57) ABSTRACT

A refrigeration system includes a compressor having a first stage and a second stage; a heat rejecting heat exchanger including an inter-cooler and a gas cooler, the intercooler coupled to an outlet of the first stage and the gas cooler coupled to an outlet of the second stage; an unload valve coupled to an outlet of the intercooler and a suction port of the first stage; a flash tank coupled to an outlet of the gas cooler; a primary expansion device coupled to an outlet of the flash tank; a heat absorbing heat exchanger coupled to an outlet of the primary expansion device, an outlet of the heat absorbing heat exchanger coupled to the suction port of the first stage; and a controller for executing a startup process
(Continued)

including controlling the unload valve to direct refrigerant from the intercooler to the suction port of the first stage.

10 Claims, 2 Drawing Sheets

(52) U.S. Cl.
CPC . *F25B 2341/0662* (2013.01); *F25B 2400/072* (2013.01); *F25B 2400/13* (2013.01); *F25B 2400/23* (2013.01); *F25B 2500/26* (2013.01); *F25B 2600/022* (2013.01); *F25B 2600/0253* (2013.01); *F25B 2600/0261* (2013.01); *F25B 2600/111* (2013.01); *F25B 2600/112* (2013.01); *F25B 2600/2509* (2013.01); *F25B 2600/2513* (2013.01); *F25B 2700/195* (2013.01); *F25B 2700/2102* (2013.01); *F25B 2700/21151* (2013.01); *F25B 2700/21152* (2013.01); *F25B 2700/21171* (2013.01); *Y02B 30/741* (2013.01); *Y02B 30/743* (2013.01)

(56) References Cited

U.S. PATENT DOCUMENTS

| | | | | |
|---|---|---|---|---|
| 3,848,422 A * | 11/1974 | Schibbye | ............ | F04B 39/062 418/97 |
| 4,919,942 A * | 4/1990 | Willrett | ............ | C12N 1/20 426/38 |
| 5,065,590 A * | 11/1991 | Powell | ............ | F04D 25/0606 62/175 |
| 5,191,776 A * | 3/1993 | Severance | ............ | F25B 1/10 62/199 |
| 2005/0132729 A1* | 6/2005 | Manole | ............ | F25B 1/10 62/149 |
| 2005/0150248 A1* | 7/2005 | Manole | ............ | F25B 25/00 62/513 |
| 2006/0086110 A1* | 4/2006 | Manole | ............ | F25B 1/10 62/175 |
| 2009/0178790 A1* | 7/2009 | Schreiber | ............ | F25B 39/028 165/158 |
| 2010/0281894 A1* | 11/2010 | Huff | ............ | F25B 9/008 62/115 |
| 2011/0005269 A1 | 1/2011 | Fujimoto et al. | | |
| 2011/0030409 A1* | 2/2011 | Fujimoto | ............ | F25B 1/10 62/324.6 |
| 2011/0138825 A1* | 6/2011 | Chen | ............ | F25B 1/10 62/115 |
| 2012/0192579 A1* | 8/2012 | Huff | ............ | B60H 1/3232 62/115 |
| 2012/0227426 A1* | 9/2012 | Deaconu | ............ | F25B 1/10 62/115 |
| 2013/0031934 A1* | 2/2013 | Huff | ............ | F25B 1/10 62/510 |
| 2014/0053585 A1* | 2/2014 | Huff | ............ | F25B 1/10 62/115 |
| 2015/0159919 A1* | 6/2015 | Sato | ............ | F25B 1/005 62/498 |
| 2015/0300713 A1* | 10/2015 | Sun | ............ | F25B 49/02 62/115 |

FOREIGN PATENT DOCUMENTS

| | | |
|---|---|---|
| CN | 101910770 A | 12/2010 |
| CN | 102016456 A | 4/2011 |
| JP | 2010025410 A | 2/2010 |
| WO | WO2008140454 | 11/2008 |
| WO | WO2011049767 A2 | 4/2011 |
| WO | WO2011049778 A1 | 4/2011 |

OTHER PUBLICATIONS

Singapore Search Report for application SG 2014005789, dated Jun. 25, 2015, 13 pages.
International Search Report; PCT/US2012/048099; date of mailing Nov. 7, 2012.
IPRP and Written Opinion; PCT/US2012/048099 date of mailing Feb. 6, 2014.
Patent Cooperation Treaty; PCT/US2012/048099; date of mailing Nov. 7, 2012.

* cited by examiner

STARTUP LOGIC FOR REFRIGERATION SYSTEM

BACKGROUND OF THE INVENTION

Embodiments relate generally to refrigerant vapor compression systems and, more particularly, to startup operations for a refrigeration system.

Refrigerant vapor compression systems are well known in the art and are commonly used for conditioning air to be supplied to a climate controlled comfort zone within a residence, office building, hospital, school, restaurant or other facility. Refrigerant vapor compression system are also commonly used in refrigerating air supplied to display cases, merchandisers, freezer cabinets, cold rooms or other perishable/frozen product storage areas in commercial establishments.

Refrigerant vapor compression systems are also commonly used in transport refrigeration systems for refrigerating air supplied to a temperature controlled cargo space of a truck, trailer, container or the like for transporting perishable/frozen items by truck, rail, ship or intermodal means. Refrigerant vapor compression systems used in connection with transport refrigeration systems are generally subject to more stringent operating conditions due to the wide range of operating load conditions and the wide range of outdoor ambient conditions over which the refrigerant vapor compression system operates to maintain product within the cargo space at a desired temperature. The desired temperature at which the cargo needs to be controlled can also vary over a wide range depending on the nature of cargo to be preserved. The refrigerant vapor compression system not only has sufficient capacity to rapidly pull down the temperature of product loaded into the cargo space at ambient temperature, but also operate efficiently at low load when maintaining a stable product temperature during transport. Additionally, transport refrigerant vapor compression systems are subject to vibration and movements not experienced by stationary refrigerant vapor compression systems.

At certain conditions (e.g., a low box set point with low ambient temperature), a refrigerated container system may experience severe compressor flooding conditions. As a result, the compressor may be damaged due to the presence of liquid. Either internal sealing or compressor valves can be destroyed. Measures to raise the suction superheat to reduce the risks to the compressor would be well received in the art.

BRIEF DESCRIPTION OF THE INVENTION

According to one aspect of the invention, a refrigeration system includes a compressor having a first stage and a second stage; a heat rejecting heat exchanger having a fan drawing ambient fluid over the heat rejecting heat exchanger, the heat rejecting heat exchanger including an intercooler and a gas cooler, the intercooler coupled to an outlet of the first stage and the gas cooler coupled to an outlet of the second stage; an unload valve coupled to an outlet of the intercooler and a suction port of the first stage; a flash tank coupled to an outlet of the gas cooler; a primary expansion device coupled to an outlet of the flash tank; a heat absorbing heat exchanger coupled to an outlet of the primary expansion device, an outlet of the heat absorbing heat exchanger coupled to the suction port of the first stage; and a controller for executing a startup process including at least one of: controlling the fan speed to reduce refrigerant heat loss in the heat rejecting heat exchanger; controlling the unload valve to direct refrigerant from the intercooler to the suction port of the first stage; and controlling the primary expansion device to restrict flow of refrigerant to the heat absorbing heat exchanger.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
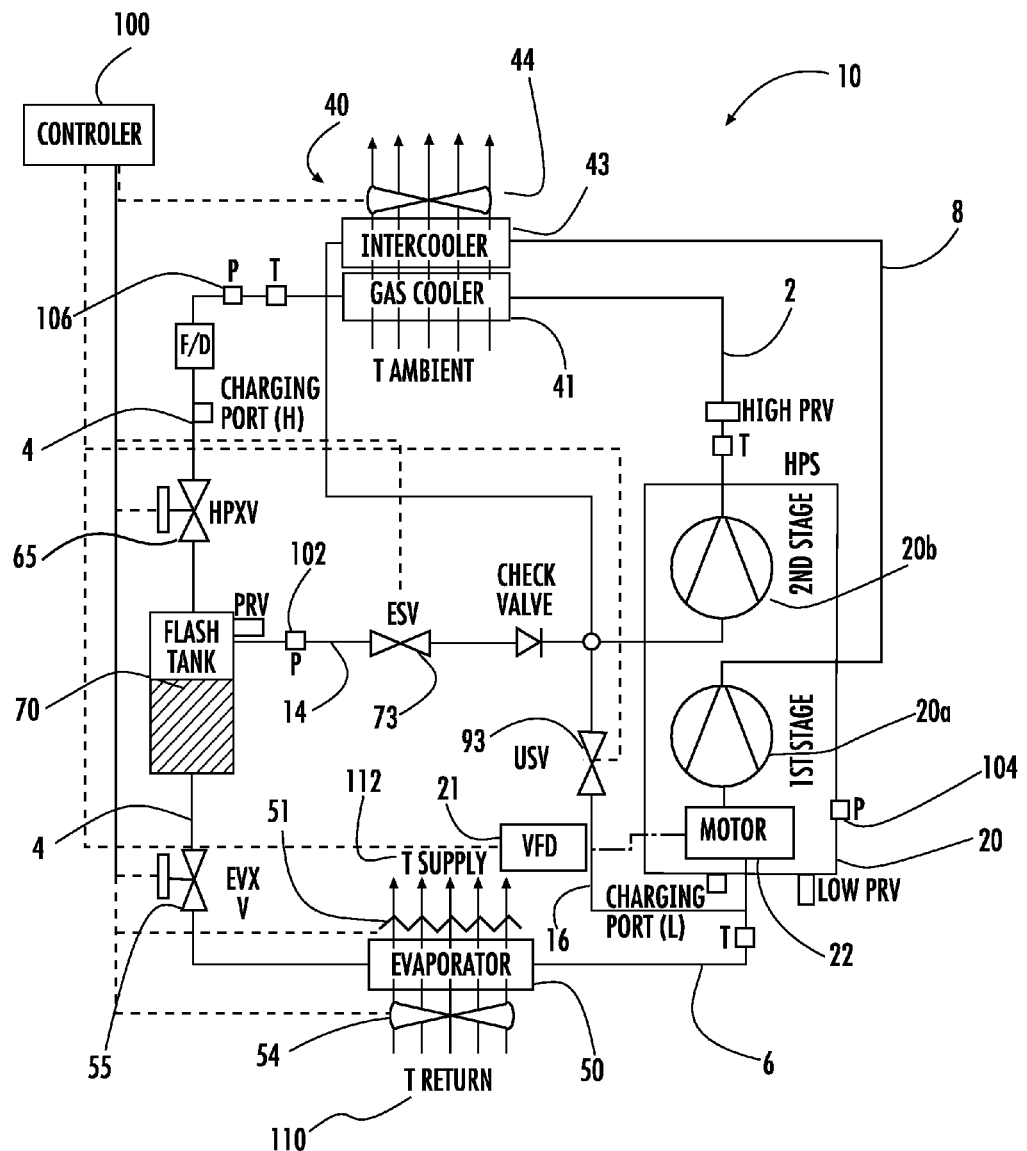
FIG. 1 is a schematic diagram illustrating an exemplary embodiment of a refrigerant vapor compression system.

FIG. 1 depicts an exemplary embodiment of a refrigerant vapor compression system 10 suitable for use in a transport refrigeration system for refrigerating the air or other gaseous atmosphere within the temperature controlled cargo space of a truck, trailer, container or the like for transporting perishable/frozen goods. The refrigerant vapor compression system 10 is also suitable for use in conditioning air to be supplied to a climate controlled comfort zone within a residence, office building, hospital, school, restaurant or other facility. The refrigerant vapor compression system could also be employed in refrigerating air supplied to display cases, merchandisers, freezer cabinets, cold rooms or other perishable/frozen product storage areas in commercial establishments.

The refrigerant vapor compression system 10 is particularly adapted for operation in a transcritical cycle with a low critical temperature refrigerant, such as for example, but not limited to, carbon dioxide. The refrigerant vapor compression system 10 includes a multi-stage compressor 20, a refrigerant heat rejecting heat exchanger 40, a refrigerant heat absorbing heat exchanger 50, also referred to herein as an evaporator, and a primary expansion device 55, such as for example an electronic expansion valve or a thermostatic expansion valve, operatively associated with the evaporator 50, with refrigerant lines 2, 4 and 6 connecting the aforementioned components in a primary refrigerant circuit.

Heat rejecting heat exchanger 40 includes a gas cooler 41 and an intercooler 43, in a heat exchange relationship with a cooling medium, such as, but not limited to, ambient air. Fan 44 draws air over the gas cooler 41 and the intercooler 43 to remove heat from refrigerant passing through the gas cooler 41 and/or the intercooler 43. Fan 44 is controllable and may be a two-speed fan operating at a first (e.g., low) and second (e.g., high) speed. Alternatively, fan 44 is a variable speed fan having a multitude of fan speeds controllable by electronic drive signals.

The refrigerant heat absorption heat exchanger 50 serves as an evaporator wherein liquid refrigerant is passed in heat exchange relationship with a fluid to be cooled, most commonly air, drawn from and to be returned to a temperature controlled environment, such as the cargo box of a refrigerated transport truck, trailer or container, or a display case, merchandiser, freezer cabinet, cold room or other perishable/frozen product storage area in a commercial establishment, or to a climate controlled comfort zone within a residence, office building, hospital, school, restaurant or other facility. In the depicted embodiments, the refrigerant heat absorbing heat exchanger 50 comprises a finned tube heat exchanger through which refrigerant passes in heat exchange relationship with air drawn from and returned to the refrigerated cargo box by the evaporator fan(s) 54 associated with the evaporator 50. The finned tube heat exchanger may comprise, for example, a fin and round tube heat exchange coil or a fin and micro-channel flat tube heat exchanger. Fan 54 is controllable and may be a two-speed fan operating at a first (e.g., low) and second (e.g., high) speed. Alternatively, fan 44 is a variable speed fan having a multitude of fan speeds controllable by electronic drive signals.

The compression device 20 functions to compress the refrigerant and to circulate refrigerant through the primary refrigerant circuit as will be discussed in further detail hereinafter. The compression device 20 may comprise a single multiple stage refrigerant compressor, such as for example a scroll compressor, a screw compressor or a reciprocating compressor, disposed in the primary refrigerant circuit and having a first compression stage 20a and a second compression stage 20b. Alternatively, the compression device 20 may comprise a pair of independent compressors 20a and 20b. In the independent compressor embodiment, the compressors 20a and 20b may be scroll compressors, screw compressors, reciprocating compressors, rotary compressors or any other type of compressor or a combination of any such compressors. In the first stage 20a of two-stage variable speed compressor 20, refrigerant is compressed from suction pressure to mid-stage pressure. The refrigerant is then cooled at intercooler 43 via refrigerant line 8. Then the refrigerant enters the second stage compressor 20b via refrigerant line 16, with refrigerant from flash tank 70 or not depending on whether economizer valve 73 is opened or closed. The refrigerant is compressed to discharge pressure in second stage compressor 20b and then cooled in a gas cooler 41.

Motor 22 drives compressors 20a and 20b. Motor 22 may, but need not be, a variable frequency drive (VFD) motor capable of operating at a number of speeds depending upon operational requirements as described in further detail herein. A VFD drive unit 21 receive drive signals from controller 100 and applies the appropriate motor control signals to motor 22.

Additionally, the refrigerant vapor compression system 10 includes a flash tank 70 interdisposed in refrigerant line 4 of the primary refrigerant circuit downstream with respect to refrigerant flow of the gas cooler 41 and upstream with respect to refrigerant flow of the evaporator 50. A secondary expansion device 65 is interdisposed in refrigerant line 4 in operative association with and upstream of the flash tank 70. The secondary expansion device 65 may be an electronic expansion valve or a fixed orifice expansion device. Refrigerant traversing the secondary expansion device 65 is expanded to a lower pressure sufficient to establish a mixture of refrigerant in a vapor state and refrigerant in a liquid state. The flash tank 70 defines a separation chamber wherein refrigerant in the liquid state collects in a lower portion of the separation chamber and refrigerant in the vapor state collects in the portion of the separation chamber above the liquid refrigerant.

Liquid refrigerant collecting in the lower portion of the flash tank 70 passes therefrom through refrigerant line 4 and traverses the primary expansion device 55 interdisposed in refrigerant line 4 upstream with respect to refrigerant flow of the evaporator 50. As this liquid refrigerant traverses the primary expansion device 55, it expands to a lower pressure and temperature before entering the evaporator 50. The evaporator 50 constitutes a refrigerant evaporating heat exchanger through which expanded refrigerant passes in heat exchange relationship with the air to be cooled, whereby the refrigerant is vaporized and typically superheated. As in conventional practice, the primary expansion device 55 meters the refrigerant flow through the refrigerant line 4 to maintain a desired level of superheat in the refrigerant vapor leaving the evaporator 50 to ensure that no liquid is present in the refrigerant leaving the evaporator 50. The low pressure refrigerant vapor leaving the evaporator 50 returns through refrigerant line 6 to the suction port of the first compression stage 20a of the compression device 20.

The refrigerant vapor compression system 10 also includes a refrigerant vapor injection line 14. The refrigerant vapor injection line 14 establishes refrigerant flow communication between an upper portion of the separation chamber of the flash tank 70 and the second stage 20b of the compressor 20. The refrigerant vapor injection line 14 includes an economizer valve 73 that is opened under certain operational conditions as described in further detail herein. The economizer valve 73 may be a solenoid valve being positionable as opened or closed. Alternatively, economizer valve 73 is a stepper valve being positionable in a multitude of operational positions.

The refrigerant vapor compression system 10 may also include a compressor unload bypass line 16. The discharge of first stage 20a of compressor 20 is coupled to intercooler 43 with refrigerant line 8. Unload bypass line 16 couples the outlet of the intercooler 43 to the suction portion of first compressor stage 20a through an unload vale 93. The unload valve 93 may be a solenoid valve being positionable as opened or closed. Alternatively, unload valve 93 is a stepper valve being positionable in a multitude of operational positions.

The refrigerant vapor compression system 10 includes a controller 100. The controller 100 controls operation of the various flow control valves 73 and 93 to selectively direct refrigerant flow through the refrigerant vapor injection line 14 and the unload bypass line 16, but also may control operation of the electronic expansion devices 55 and 65, the compressor 20, and the fans 44 and 54. As in conventional practice, in addition to monitoring ambient conditions, the controller 100 also monitors various operating parameters by means of various sensors operatively associated with the controller 100 and disposed at selected locations throughout the system. For example, in the exemplary embodiment depicted in FIG. 1, a pressure sensor 102 is disposed in operative association with the flash tank 70 to sense the pressure within the flash tank 70, a pressure sensor 104 is provided to sense the refrigerant suction pressure, and a pressure sensor 106 is provided to sense refrigerant discharge pressure. The pressure sensors 102, 104, 106 may be conventional pressure sensors, such as for example, pressure transducers. Further, temperature across the evaporator is measured by a return temperature sensor 110 and a supply temperature sensor 112. The temperature sensors 110 and 112 may be conventional temperature sensors, such as for example, thermocouples or thermistors.

Figure 2:
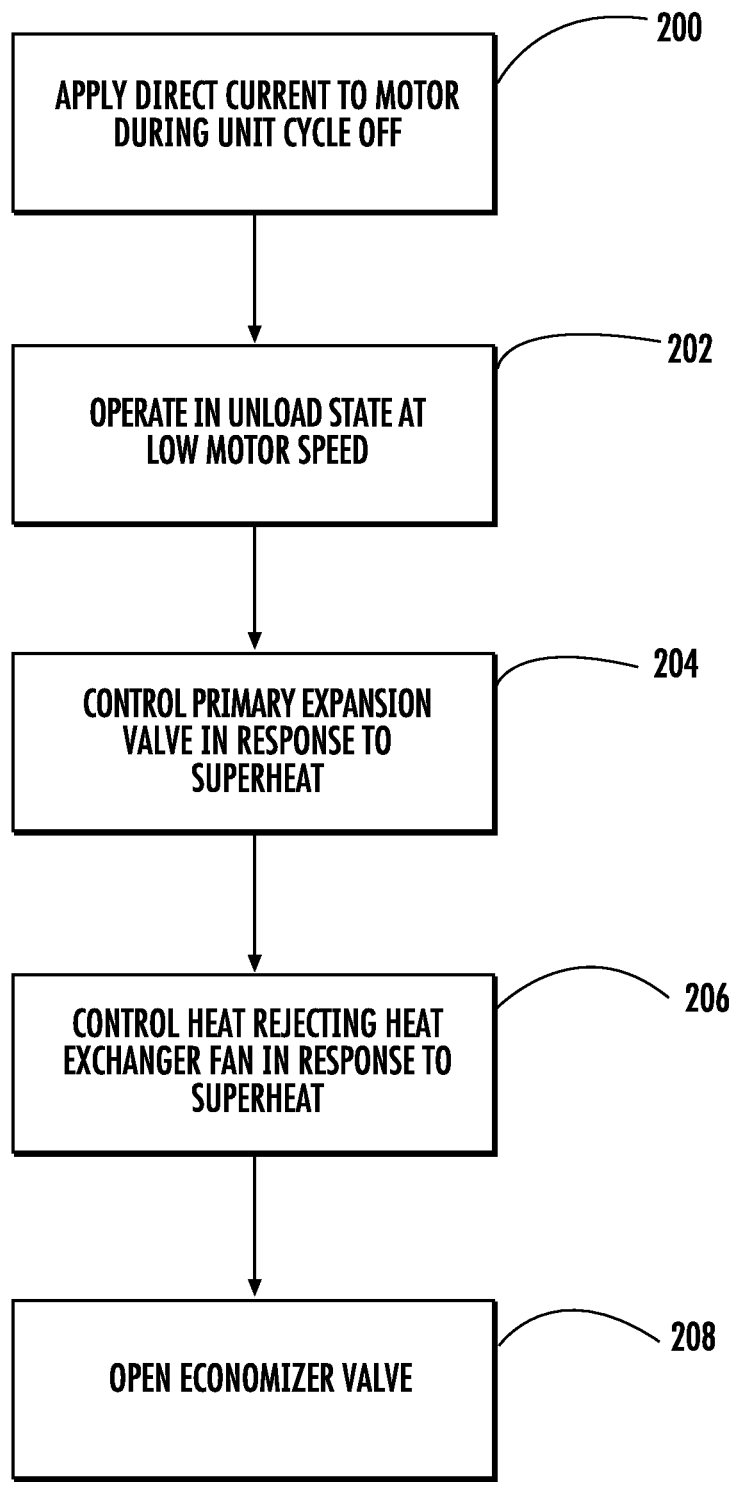
FIG. 2 is depicts exemplary startup operations for the system of FIG. 1.

As noted above, during certain conditions (low set point and low ambient temperature) transport refrigeration units may experience compressor flooding. This can be due to the fact that frozen cargo causes the evaporator and compressor to be quite cold. Upon start up, it is desirable to increase the superheat of suction gas in compressor 20 using one or more measures. FIG. 2 is a process chart of a number of techniques that may be used to increase the temperature of the compressor 20 and refrigerant flowing in the system on startup. Increasing temperature of the compressor and/or the refrigerant reduces the likelihood of compressor flooding due to refrigerant remaining in a certain degree of positive superheat. The techniques described with reference to FIG. 2 may be applied in any order and may be applied simultaneously, and no ordering of the techniques is suggested by the presentation of the techniques in FIG. 2. Additionally, one, all or any number of the techniques in FIG. 2 may be employed.

As show in FIG. 2, a technique used during an off cycle is to apply direct current to motor 22 as shown at 200. Motor 22 may be a VFD motor, meaning an AC signal is used to turn the motor. Applying a DC signal to motor 22 generates heat, as the motor windings serve as electric resistance heaters, without causing the motor to drive the compressor. Heating motor 22 reduces the occurrence of the migration of liquid refrigerant to the compressor 20 when the system is off.

Another technique used upon startup includes opening the unload valve 93 and operating motor 22 at a low speed (i.e., low frequency drive signal) as shown at 202. This circulates refrigerant through intercooler 43, unload bypass line 16 and unload valve 93 back to the suction port of first stage compressor 20a. Operating at a low speed with unload valve open allows the motor 22 to warm up, without pulling refrigerant from the evaporator 50, which is typically quite cool upon startup.

Another technique used upon startup is to control primary expansion device 55 so that little or no refrigerant enters the evaporator 50 on startup as shown at 204. As noted above, the evaporator 50 is typically quite cold on startup. Preventing refrigerant from entering evaporator 50 prevents cold refrigerant from reaching the suction port of first compressor stage 20a, thereby facilitating an increase in compressor and refrigerant temperature. The position of primary expansion device 55 is controlled by controller 100 in response to a superheat measurement. Superheat may be determined based on temperature at the evaporator or anywhere along suction line 6 or internal to compressor 20 and the suction pressure from pressure sensor 104. As the superheat increases, primary expansion device 55 may be opened incrementally, in such a way that the superheat and primary expansion device 55 flow rate are directly proportional.

Another technique used upon startup includes controlling the speed of fan 44 at the heat rejecting heat exchanger 40 as shown at 206. Upon startup, fan 44 may be turned off or run at reduced speed while the system runs in unload mode with unload valve 93 open. Alternatively, fan 44 may be turned off or run at reduced speed while the system runs in standard mode with unload valve 93 close. This allows the refrigerant in refrigerant line 8 to retain compression heat generated during first stage compression 20a when passing through intercooler 43. As the superheat increases, speed of fan 44 is increased. If fan 44 is a two speed fan, then the fan may be set to low speed. If fan 44 is a variable speed fan, the fan speed may be increased by some percentage. As the system enters normal operating mode, fan 44 is run at a high speed.

Another technique used upon startup is to open economizer valve 73 as shown at 208. As primary expansion device 55 is closed or choked upon startup, refrigerant flowing into flash tank 70 is restricted from exiting through primary expansion valve 55. Controlling economizer valve 73 prevents critical refrigerant from entering compressor.

It is understood that the techniques used upon startup shown in FIG. 2 may be varied in response, for example, to ambient conditions and/or conditions in the area to be conditioned. Less than all of the techniques shown in FIG. 2 may be employed. Further, the sequence of operations in FIG. 2 is not limiting, as the techniques may be applied in any order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A refrigeration system comprising:
   a compressor having a first stage and a second stage;
   a heat rejecting heat exchanger having a fan drawing ambient fluid over the heat rejecting heat exchanger, the heat rejecting heat exchanger including an intercooler and a gas cooler, the intercooler coupled to an outlet of the first stage and the gas cooler coupled to an outlet of the second stage;
   an unload valve coupled to an outlet of the intercooler and a suction port of the first stage;
   a flash tank coupled to an outlet of the gas cooler;
   a primary expansion device coupled to an outlet of the flash tank;
   a heat absorbing heat exchanger coupled to an outlet of the primary expansion device, an outlet of the heat absorbing heat exchanger coupled to the suction port of the first stage; and
   a controller configured to execute a startup process including the controller configured to control the fan speed to reduce refrigerant heat loss in the heat rejecting heat exchanger;
   wherein controlling the fan speed in the startup process includes the controller configured to control fan speed in response to superheat, wherein the fan speed is proportional to the superheat.

2. The refrigeration system of claim 1 wherein:
   the controller is configured to control the unload valve to direct refrigerant from the intercooler to the suction port of the first stage during the startup process.

3. The refrigeration system of claim 2 wherein:
   during the startup process, in addition to controlling the unload valve, the controller is configured to perform controlling the primary expansion device to restrict flow of refrigerant to the heat absorbing heat exchanger.

4. The refrigeration system of claim 3 wherein:
   controlling the primary expansion device includes controlling primary expansion device in response to superheat.

5. The refrigeration system of claim 4 wherein:
   controlling the primary expansion device includes incrementally opening the primary expansion device in response to an increase in superheat.

6. The refrigeration system of claim 2 further comprising:
an economizer valve coupling the flash tank to an inlet of the second stage.

7. The refrigeration system of claim 6 wherein:
during the startup process, in addition to controlling the unload valve, the controller is configured to control the economizer valve to control flow of refrigerant from the flash tank to the inlet of the second stage.

8. The refrigeration system of claim 7 wherein:
control of the economizer valve includes opening the economizer valve.

9. The refrigeration system of claim 2 further comprising:
a motor for driving the first stage and the second stage;
wherein during the startup process, the controller is configured to apply direct current to the motor.

10. The refrigeration system of claim 2 wherein:
controlling the unload valve includes opening the unload valve.

* * * * *